US008823776B2

(12) United States Patent
Tian et al.

(10) Patent No.: US 8,823,776 B2
(45) Date of Patent: Sep. 2, 2014

(54) IMPLEMENTING SELECTIVE IMAGE ENHANCEMENT

(75) Inventors: Dihong Tian, San Jose, CA (US); J. William Mauchly, Berwyn, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 1084 days.

(21) Appl. No.: 12/784,257

(22) Filed: May 20, 2010

(65) Prior Publication Data

US 2011/0285825 A1 Nov. 24, 2011

(51) Int. Cl.
H04N 13/02 (2006.01)
G06K 9/40 (2006.01)
H04N 9/64 (2006.01)
G06T 5/00 (2006.01)

(52) U.S. Cl.
CPC ............ *H04N 13/025* (2013.01); *H04N 9/646* (2013.01); *G06T 5/007* (2013.01); *G06T 2207/10028* (2013.01); *G06T 2207/10021* (2013.01); *H04N 13/0271* (2013.01)
USPC .......................................... 348/47; 382/266

(58) Field of Classification Search
USPC ........................................... 348/47; 382/266
See application file for complete search history.

(56) References Cited

U.S. PATENT DOCUMENTS

| | | | |
|---|---|---|---|
| 6,911,995 B2 | 6/2005 | Ivanov et al. | |
| 7,715,657 B2 | 5/2010 | Lin et al. | |
| 7,719,605 B2 | 5/2010 | Hirasawa et al. | |
| 7,719,662 B2 | 5/2010 | Bamji et al. | |
| 7,720,277 B2 | 5/2010 | Hattori | |
| 2010/0080485 A1* | 4/2010 | Chen et al. | 382/266 |
| 2010/0142815 A1* | 6/2010 | Sim | 382/167 |
| 2011/0285910 A1* | 11/2011 | Bamji et al. | 348/631 |

OTHER PUBLICATIONS

Ronen Gvili, Amir Kaplan, Eyal Ofek and Giora Yahav, Depth keying, 3DV Systems Ltd. Stereoscopic Displays and Virtual Reality Systems X, Andrew J. Woods, Mark T. Bolas, John O. Merritt, Stephen A. Benton, Editors, Proceedings of SPIE-IS&T Electronic Imaging, SPIE vol. 5006 (2003).*
Cuizhu Shi et al., *Automatic Image Quality Improvement for Videoconference*, 0-7803-8484-9/04 © 2004 IEEE, ICASSP 2004, pp. III-701-4. 2004.
Ronen Gvili et al., *Depth Keying*, 3DV Systems Ltd., 2006 (11 pages). 2006.

* cited by examiner

*Primary Examiner* — Sath V Perungavoor
*Assistant Examiner* — Xiaolan Xu
(74) *Attorney, Agent, or Firm* — Baker Botts L.L.P.

(57) ABSTRACT

A method that includes capturing depth information associated with a first field of view of a depth camera. The depth information is represented by a first plurality of depth pixels. The method also includes capturing color information associated with a second field of view of a video camera that substantially overlaps with the first field of view of the depth camera. The color information is represented by a second plurality of color pixels. The method further includes enhancing color information represented by at least one color pixel of the second plurality of color pixels to generate an enhanced image. The enhanced image adjusts an exposure characteristic of the color information captured by the video camera. The at least one color pixel is enhanced based on depth information represented by at least one corresponding depth pixel of the first plurality of depth pixels.

17 Claims, 2 Drawing Sheets

IMPLEMENTING SELECTIVE IMAGE ENHANCEMENT

TECHNICAL FIELD

The present disclosure relates generally to video image quality and more particularly to implementing selective image enhancement.

BACKGROUND

In video conferencing, image quality heavily depends on the lighting conditions of the environment. Unsatisfactory environmental lighting often results in under exposure and low contrast in the areas of interest. This is particularly true when attempting to capture a participant's face. Prior attempts to resolve this issue have been based on such things as creating an intensity transformation model on pixels based on the detection of a human face. These face centric approaches may still suffer from bad illumination conditions as the face detection often relies on a reasonably good observation of skin tone pixels. Moreover, in circumstances where the area of interest is not a human face (e.g., objects that people hold close to the camera during a desk top video conferencing session) a face centric approach will fail to adjust the illumination properly.

BRIEF DESCRIPTION OF THE FIGURES

For a more complete understanding of particular embodiments and their advantages, reference is now made to the following description, taken in conjunction with the accompanying drawings, in which.

DESCRIPTION

Overview

The teachings of the present disclosure relate to a method that includes capturing depth information associated with a first field of view of a depth camera. The depth information is represented by a first plurality of depth pixels. The method also includes capturing color information associated with a second field of view of a video camera that substantially overlaps with the first field of view of the depth camera. The color information is represented by a second plurality of color pixels. The method further includes enhancing color information represented by at least one color pixel of the second plurality of color pixels to generate an enhanced image. The enhanced image adjusts an exposure characteristic of the color information captured by the video camera. The at least one color pixel is enhanced based on depth information represented by at least one corresponding depth pixel of the first plurality of depth pixels.

Description of Example Embodiments

Figure 1A:
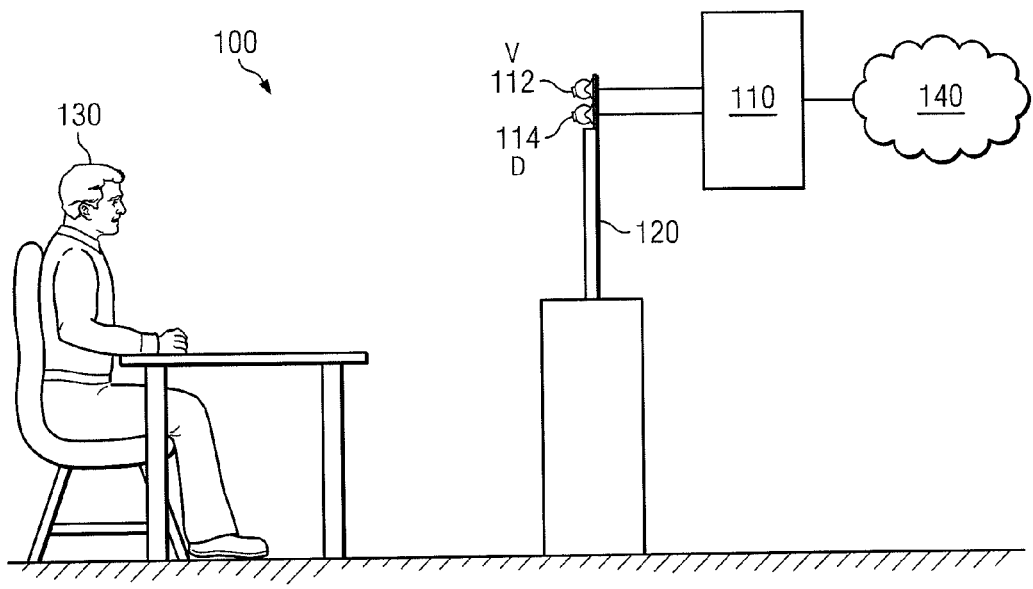
FIG. 1A illustrates a side view of a camera configuration for video conferencing equipment configured to implement selective image enhancement, in accordance with particular embodiments.
Figure 1B:
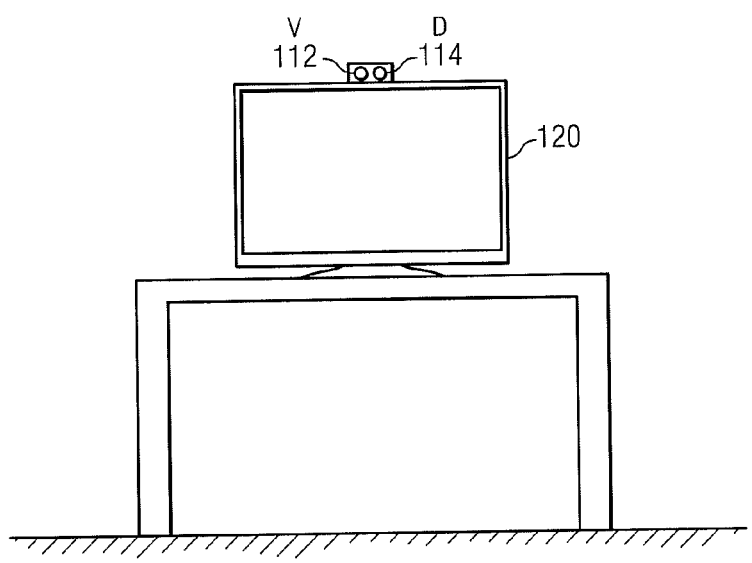
FIG. 1B illustrates a front view of a different camera configuration for video conferencing equipment configured to implement selective image enhancement, in accordance with particular embodiments.

FIG. 1A illustrates a side view of a camera configuration for video conferencing equipment configured to implement selective image enhancement and FIG. 1B illustrates a front view of a different camera configuration for video conferencing equipment configured to implement selective image enhancement, in accordance with particular embodiments. Video conferencing equipment 100 comprises video camera 112, depth camera 114, image processor 110, display 120, and network 140. These components may work together to provide selective image enhancement. For example, image processor 110 may enhance at least one exposure characteristic of certain portions (e.g., the face of participant 130) of the video frames captured by video camera 112. The portions of the video frame that are enhanced and the extent of the enhancement may be based on the how far the objects captured by the video frames are from depth camera 114. This distance may be represented as depth information captured by depth frames generated by depth camera 114.

In particular embodiments, video camera 112 and depth camera 114 may be co-located with one another. Relative to one another, cameras 112 and 114 may be arranged side by side (FIG. 1B), one on top of the other (FIG. 1A), or in any other suitable configuration. Regardless of the relative arrangement of cameras 112 and 114, in particular embodiments cameras 112 and 114 may be close together so that their respective fields-of-view overlap and so they capture similar perspectives of, for example, participant 130.

Depending on the scenario and/or configuration, cameras 112 and 114 may be located within close proximity to display 120. This may aid in providing a more natural interaction between participant 130 and a remote participant (e.g., it may increase the accuracy of eye contact between the participants). Depending on the conferencing needs of conferencing system 100, the actual arrangement may vary between cameras 112 and 114, and display 120. For example, cameras 112 and 114 may be positioned above or below display 120.

Regardless of the positioning of cameras 112 and 114, they may be aligned so as to capture participant 130. More specifically, video camera 112 may be aligned to capture a video image of participant 130 while the depth camera 114 may be aligned to capture depth information for the image captured by video camera 112. This may allow image processor 110 to enhance the video frames of participant 130 based on the depth frames collected by depth camera 114.

Upon image processor 110 receiving the frames from the two cameras, it may enhance an exposure characteristic of at least a portion of the pixels that make up the video frames based on the depth information within the depth frame. In particular embodiments, this may comprise image processor 110 using the depth information from depth camera 114 to generate a weight matrix. The weight matrix may be a two-dimensional array of values that are based on the distance an object is from depth camera 114. Each value of the weight matrix may be applied to at least one corresponding individual pixel of the video image. This may allow image processor 110 to compensate for poor environmental lighting by, for example, enhancing an exposure characteristic of objects of interest (e.g., those objects closest to cameras 112 and 114).

Video camera 112 may use a color sensor to capture video frames, and depth camera 114 may use a depth sensor to capture depth frames. The color information captured by the color sensor and the depth information captured by the depth sensor may take any of a variety of forms depending on the type of sensor and camera used. In some embodiments, the color sensor and the depth sensor may share one or more components (e.g., housing, lens, power supply, memory, processor, interface, etc.) Depending on the embodiment, video camera 112 and depth camera 114 may capture frames at an approximately equal or at an unequal rate. This may require image processor 110 to synchronize the frames from cameras 112 and 114. For example, a single frame from the depth camera 114 may be used to enhance several frames from the image from the video camera 112.

Once image processor 110 has generated an enhanced video frame, the video frame may be transmitted, alone or with a group of frames, in whole or in part, via network 140. Although the illustrated embodiment shows only a single network 140, the term "network" should be interpreted as generally defining any interconnection of components capable of transmitting audio and/or video communication signals, data, and/or messages, including signals, data or messages transmitted through streaming media, text chat, instant messaging and e-mail. Network 140 may be implemented as, or be connected to one or more of, a local area network (LAN), wide area network (WAN), a public switched telephone network (PSTN), global distributed network (e.g., the Internet), Intranet, Extranet, or any other form of wireless or wireline communication network. Network 140 may be a combination of one or more network types, such as those listed above. Any network components capable of exchanging audio, video, or other data using frames or packets are included within the scope of particular embodiments.

Video camera 112 may comprise any type of camera capable of capturing color information. The color information may be contained in a series of video frames. The video information may be in any of a variety of forms or values used to represent one or more of the color, shade, brightness, chrominance, luminance, or any other form or value used to represent the actual coloring of an object within the field of view of camera 112. In particular embodiments, video camera 112 may be aligned such that its field of view is centered on an area in which participant 130 is sitting, thus allowing video camera 112 to capture participant 130. Video from video camera 112 may comprise a series of frames containing at least a portion of the field of view of video camera 112. The frames may be captured at a certain frame rate typically measured in frames per second (e.g., 30 fps). Each frame may comprise a certain number of pixels, and the number of pixels may be referred to as the resolution. Each pixel may comprise color information that reflects the color of the object being captured. In some embodiments, each pixel of the video frame may contain multiple values (e.g., red, green and blue; or luminance and chrominance).

In certain embodiments, video camera 112 may be substantially automated (e.g., auto focus, auto exposure, etc.). Unfortunately, certain factors, such as lighting conditions, can cause poor image quality, particularly within an area of interest (e.g., the face of participant 130). For example, if participant 130 is sitting in front of a window, the light from the window (shining from behind participant 130 towards video camera 112) may cause camera 112 to adjust its exposure level such that the face of participant 130 may be overly dark.

Depth camera 114 may comprise any type of camera capable of collecting depth information and generating depth frames. Depth information may comprise any of a variety of forms or values used to indicate the distance from depth camera 114 to a portion of an object within the field of view of depth camera 114. For example, in some embodiments, depth camera 114 may comprise an infrared camera. An infrared camera may use time of flight technology with infrared light to sense depth and determine depth values. More specifically, in such embodiments, depth camera 114 may be able to capture depth information by emitting infrared light pulses and then measuring the reflectance using fast shutters. This may allow for effective depth detection, within certain distances, regardless of the lighting conditions. As another example, in some embodiments, depth camera 114 may comprise a stereo camera. In such an embodiment the depth information associated with different objects may be determined by comparing two frames captured from the two different cameras forming the stereo camera.

In some embodiments, depth camera 114 may be aligned such that its field of view is centered on the same area of interest as video camera 112 (e.g., where participant 130 is sitting). This may allow depth camera 114 to determine the depth of various objects (e.g., participant 130) within at least a portion of both its field of view and the field of view of video camera 112. The depth information from depth camera 114 may comprise a series of depth frames containing at least a portion of the field of view of depth camera 114. The frames may be captured at a certain frame rate typically measured in frames per second. Each frame may comprise a certain number of pixels, and the number of pixels may be referred to as the resolution. The depth information represented in the pixels of the depth frames may be based on the relative distance from depth camera 114 of the object being represented by the respective pixel.

Depending on the embodiment, the resolution and frame rate of depth camera 114 may be different than the resolution and frame rate of video camera 112. Furthermore, while the fields of view of cameras 112 and 114 may substantially overlap, the perspective with which objects are captured may differ between cameras 112 and 114. Because of the possible spatial, temporal, and resolution differences between cameras 112 and 114, some embodiments may calibrate the geometric correspondence and timing between cameras 112 and 114. This may allow for image processor 110 to properly match the appropriate depth to an object captured by video camera 112. The calibration may be performed using any of a variety of techniques.

Once cameras 112 and 114 are calibrated, image processor 110 may enhance an exposure characteristic of the video frames from video camera 112 by applying an appropriate depth based weight matrix. This may result in an improvement in the clarity of objects (e.g., objects of interest) in poor lighting conditions by enhancing exposure characteristics of objects that are closer to cameras 112 and 114. In particular embodiments, the depth based weight matrix may comprise weight values based on the detected infrared intensity of a respective corresponding pixel in the depth frame. More specifically, in particular embodiments, the closer an object is to depth camera 114, the more infrared reflectance that may be received by depth camera 114. The closer the object is to depth camera 114 the greater the intensity of the captured image. As the intensity of a pixel within the captured image increases, so to does the corresponding value in the weight matrix. Thus, using the measured intensity, a two-dimensional weight matrix may be generated either by depth camera 114 or image processor 110.

In particular embodiments, the weight matrix may be a linear transformation of the depth frame generated by depth camera 114. For example, if it is assumed that W is the weight value for a particular pixel (or a particular component of a pixel, such as a red, green, or blue component), D is the value of the pixels from the depth frame normalized between 0 and 1, and A and B are two constants set (in particular embodiments, between 0 and 1) to allow for additional control over the resulting weight value (e.g., to improve the results based on the camera or display used during a conference), then $W=A*D+B$ may be used to determine each individual value of the weight matrix. To form the two-dimensional weight matrix the above equation would be applied to each pixel that makes up the depth frame from depth camera 114. Thus, it may be the case that the dimensions of the two-dimensional weight matrix may correspond to the resolution of the depth frame. In particular embodiments, the individual values of the weight matrix may, in part, select the object or objects which are enhanced.

As mentioned above, the weight matrix may be used by image processor 110 to enhance one or more pixels of one or more video frames from video camera 112. For example, in some embodiments, image processor 110 may perform a simple multiplication of the pixels of a video frame by the weight matrix: $I'=W \times I$ (wherein I' may be the enhanced color image, I may be the original color image, and W may be the weight matrix). In such an embodiment, the multiplication may be an element-by-element multiplication for each pixel of the video frame. In some embodiments, not all pixels will actually be enhanced. For example, image processor 110 may determine that only objects within a certain distance (e.g., having a certain depth value) of depth camera 114 should be enhanced. The elements of the weight matrix corresponding to these objects may be one value, while the rest of the elements may be another value. Image processor 110 may also include encoded logic that may be used to recognize certain features or characteristics of the video image to help determine what should be enhanced. For example, face recognition may be used to help identify participant 130 (to be enhanced) and/or object recognition may be used to help identify the conference table (to not be enhanced).

In some embodiments, more sophisticated, non-linear transformations may be applied in generating the weight matrix, applying the weight matrix to the video frame, or both. This may be done to better handle noise within the depth frame and to improve the perceived quality of the enhanced video frame. For example, the weight matrix may be determined by the logarithm of the distance transform of the depth frame. As another example, the video frame may be enhanced using a power law expression, such as $I'=I^w$.

In particular embodiments, the video frames from video camera 112 may be enhanced to simulate a light source being in front of participant 130 (or the object being enhanced). Thus, image processor 110 may automatically adjust the perceived illumination based on the depth of the object from cameras 112 and 114 thereby allowing for improved image quality in video conferencing. For example, the enhanced images of participant 130, being closer to the camera, may appear lighter and reveal more details in participant 130.

Image processor 110 may enhance the frames from video camera 112 by adjusting the intensity and/or the contrast of the frame's pixels. In particular embodiments, the enhanced image may comprise adjustments to the red, green, and blue values of the pixels, luminance values of the pixels, color balance of the pixels, or white balance of the pixels.

Figure 2:
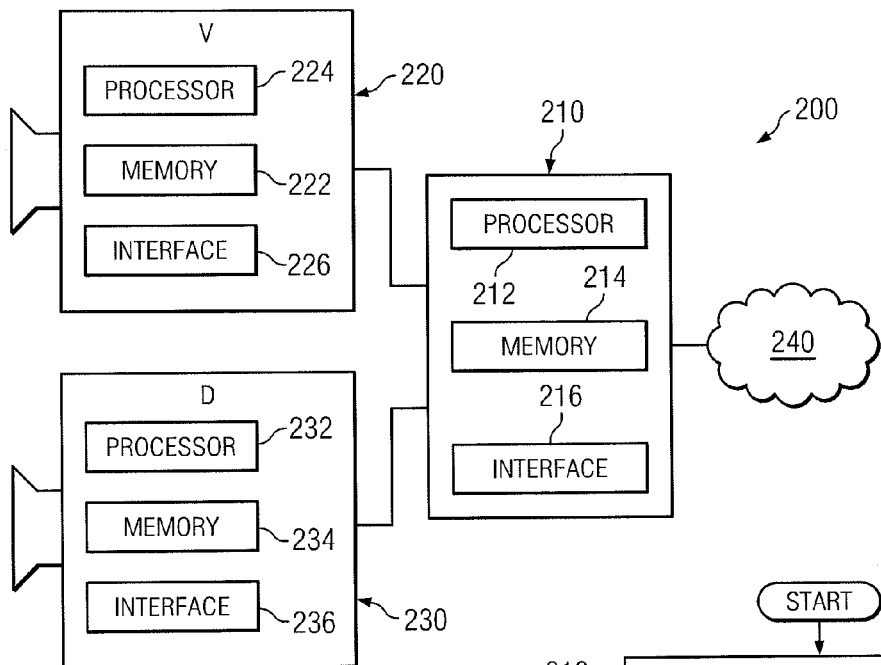
FIG. 2 illustrates a detailed block diagram of particular components of the video conferencing equipment depicted in FIG. 1, in accordance with particular embodiments.

FIG. 2 illustrates a detailed block diagram of particular components of the video conferencing equipment depicted in FIG. 1, in accordance with particular embodiments. As depicted in FIG. 2, conferencing equipment 200 includes image processor 210, video camera 220, depth camera 230 and network 240. Though image processor 210, video camera 220, and depth camera 230 all comprise processors, memory and interfaces, the actual type and/or quantity of components used may vary between the devices. For simplicity, rather than discussing some of the options for the components of image processor 210, video camera 220, and depth camera 230 separately, the processor, memory, and interface will be discussed generally with respect to image processor 210.

Processor 212 may be a microprocessor, controller, application specific integrated circuit (ASIC), field-programmable gate array (FPGA), or any other suitable computing device, resource, or combination of hardware with encoded software or embedded logic operable to provide, either alone or in conjunction with other image processor 210 components (e.g., memory 214 and/or interface 216) image processor functionality. Such functionality may include enhancing at least one exposure characteristic of at least a portion of one or more video frames before they are communicated to a remote participant. The enhancement may be made, in part, based on the proximity of an object to cameras 220 and 230.

Memory 214 may be any form of volatile or non-volatile memory including, without limitation, magnetic media, optical media, random access memory (RAM), read-only memory (ROM), erasable programmable ROM (EPROM), electrically erasable programmable ROM (EEPROM), removable media, flash memory, or any other suitable local or remote memory component. Memory 214 may store any suitable data or information, including encoded software, or embedded logic, utilized by image processor 210 and/or processor 212. For example, memory 214 may store a table, list, or other organization of data describing the spatial and temporal synchronization of video camera 220 and depth camera 230.

Interface 216 may comprise any hardware combined with any encoded software, or embedded logic needed to be able to send and receive information with other components participating in a video conference. Interface 216 may, for example, transmit the enhanced video frames from image processor 210 to a remote participant. Depending on the embodiment, interface 216 may provide any wired or wireless connection and support any wired or wireless protocol necessary to allow for the communication of video during a video conference.

In certain embodiments, image processor 210 may attempt to enhance one or more exposure characteristics of the video frames generated by video camera 220. This may allow image processor 210 to correct for poor backlighting which may cause video camera 220 to generate frames in which the participant's face is underexposed. The enhancement may involve, for example, adjusting the red, green, and blue values of at least some pixels of the video frame, the luminance values of at least some pixels of the video frame, the color balance values of at least some pixels of the video frame, and/or the white balance values of at least some pixels of the video frame. These adjustments may be made, for example in an embodiment using a linear technique, by performing pixel-by-pixel multiplication of the weight matrix with the video frame.

As mentioned above, in certain embodiments cameras 220 and 230 may be positioned in close proximity to one another and may be aligned so that their respective fields of view substantially overlap with one another. Furthermore, in certain embodiments cameras 220 and 230 may be synchronized both spatially (e.g., image processor 210 may be able to associate a pixel from depth camera 230 to the corresponding pixel in video camera 220) and temporally (e.g., image processor 210 may be able to match the timing of the frames from depth camera 230 with the frames from video camera 220).

Cameras 220 and 230 may each capture a series of frames. Each frame may be composed of a two-dimensional array of pixels. The resolutions of the frames captured by cameras 220 and 230 may not be equal. Similarly, the frame rate of cameras 220 and 230 may be unequal. The dissimilarities between cameras 220 and 230 may be corrected by synchronizing the frames from the two sources.

In particular embodiments, both cameras 220 and 230 may transmit, via interfaces 226 and 236, respectively, unedited frames to image processor 210. Depending on the lighting conditions and/or the room configuration, processor 222 may not be able to configure video camera 220 to capture and transmit properly exposed video frames. For example, where there is a window in the background, the light from the window may cause processor 222 to set the aperture of video camera 220 such that the participant, and likely any objects that the participant holds up for the remote participant to view, will be underexposed. Furthermore, the unedited frames from depth camera 230 may contain imperfections and noise.

Image processor 210 may address one or more of the flaws in the frames from cameras 220 and 230. For example, processor 212 may transform each depth frame received by image processor 210 into a weight matrix. Each value of the weight matrix is based on a value of a pixel from the depth frame. Thus, the values that constitute the two dimensional weight matrix are based on the distance objects are from depth camera 230. The type of transformation used may vary depending on the embodiment and/or scenario. Generally speaking, the determination of how to transform a depth frame into a weight matrix may comprise a trade-off between the computational load on processor 212 and the ability of image processor 210 to reduce the amount of noise and/or imperfections in the depth frame. Depending on the embodiment, the size (e.g., the number of rows and columns) of the weight matrix may vary between, and including, the size (resolution) of the depth frame and the size of the (resolution) of the video frame. The weight matrix may be stored in memory 214 for subsequent application to a video frame.

Once the weight matrix has been calculated, processor 212 may then proceed to enhance an exposure characteristic of one or more pixels of the video frame based on a corresponding value in the weight matrix. Depending on the embodiment and/or scenario, one or more techniques may be used to enhance the video frame based on the weight matrix. For example, linear and non-linear techniques may be used to enhance the video frame. In determining how to enhance the video frame, particular embodiments may consider the trade-off between computational complexity and the quality of the enhanced video frame.

In some embodiments, in selecting the pixels to be enhanced, processor 212 may not only consider those pixels representing objects close to cameras 220 and 230 (e.g., having a weight value above/below a threshold weight value), but it may also apply one or more object recognition techniques. For example, a face recognition technique may be used to increase the likelihood that a participant's face is enhanced. As another example, a shape recognition technique may be used to identify objects to ignore from enhancement, such as a conference table. The recognition techniques may be applied to the video frames, the depth frames, or both. Furthermore, certain embodiments may take into account the infrared reflectance properties of certain surfaces such as dark hair or eye glasses. In certain embodiments, spatial and temporal de-noising techniques as well as heuristics may be applied to obtain the resulting infrared image.

Thus far, several different embodiments and features have been presented. While cameras 220 and 230 are shown as separate components, they may, in certain embodiments, be a single component with two separate sensors (e.g., a color sensor and a depth or IR sensor). Particular embodiments may combine one or more features depending on operational needs and/or component limitations. This may allow for great adaptability to the needs of various organizations and users. Some embodiments may include additional features.

Figure 3:
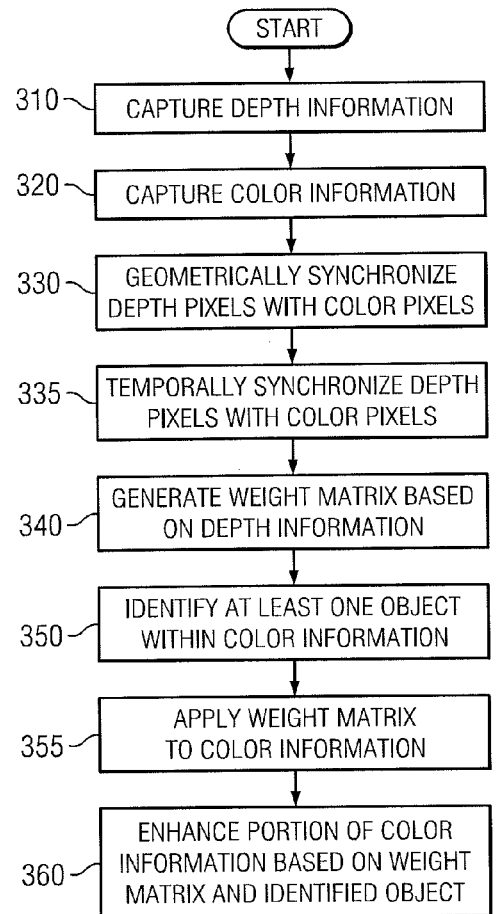
FIG. 3 illustrates a method for implementing selective image enhancement, in accordance with particular embodiments.

FIG. 3 illustrates a method for implementing selective image enhancement, in accordance with particular embodiments. It may be assumed, for purposes of this method, that the steps are performed via a conferencing system similar to conferencing systems 100 and 200. It may further be assumed that the conferencing system includes two cameras, a depth camera and a video camera. The cameras may be collocated in close proximity to one another and to a display device.

The method begins at step 310 with the capturing of depth information. The depth information may be captured by a depth camera as a series of depth frames. In particular embodiments, each frame may consist of a two-dimensional array of pixels. Each of these pixels may comprise a value indicative of a relative distance, or depth, from the depth camera to a particular portion of an object within the field of view of the depth camera. In other words, the depth information may provide an array of pixels representing how close various objects are to the depth camera. Depending on the embodiment, the depth camera may consist of an IR camera, a stereo camera, or any other mechanism or device capable of generating depth information.

At step 320 color information is captured. The color information may be captured by a video camera as a series of video frames. The color frames may consist of color information represented by a plurality of color pixels arranged in a two dimensional array. Each of the pixels may comprise a value (or several values) indicative of the color of a particular portion of an object within the field of view of the video camera. The composition of the color information maintained by each pixel may vary depending on the embodiment. For example, in some embodiments, the color information may comprise a red, green, and blue value associated with a particular pixel. In particular embodiments, the color information may comprise a luminance value and a chrominance value associated with each pixel.

At step 330 the depth pixels are geometrically synchronized with the color pixels. More specifically, in order to help insure that the correct color pixels are enhanced based on the appropriate corresponding depth pixel (step 360 below), some embodiments may spatially and/or spectrally and/or geometrically align the pixels of the frames such that the depth pixels and the color pixels correspond to the same portion of the same object. For example, geometric synchronization may help ensure that the color and depth pixels are aligned such that a color pixel representing a portion of a participant's eye corresponds with a depth pixel representing a similar portion of the participant's eye. The spatial/geometric synchronization may be necessitated by the fact that the two cameras may generate frames having different resolutions and that the cameras may each capture an object with a slightly different perspective and each may have a slightly different field of view.

At step 335 the depth pixels are temporally synchronized with the color pixels. This may account for those embodiments in which the depth frames and the color frames have differing frame rates or are transmitted or generated at differing times. In particular embodiments in which the depth frame rate varies from the video frame rate, the synchronization at step 320 may require synchronizing the video and depth frames such that one or more depth frames are used with one or more color frames. For example, if the video camera generates 60 frames per second, and the depth camera generates 30 frames per second, then one depth frame may correspond to two video frames.

At step 340 a weight matrix is generated based on the depth information. More specifically, the depth value associated with each depth pixel may be converted into a particular weight value. The weight values may be normalized between 0 and 1 (or any other suitable range). Each weight value may then be entered into one or more corresponding positions of the weight matrix based on the depth pixel's position within the depth frame. For example, where a depth frame has a lower resolution than a video frame, the same depth pixel, and therefore the same weight, may have to be used for more than one video pixel. In some embodiments, where there are fewer depth pixels than video pixels, additional weight values may be generated based on one or more neighboring depth pixels. Converting the depth information for a particular pixel into a corresponding weight value may comprise performing any of a variety of transformation techniques, including both linear and non-linear techniques.

At step 350 at least one object within the color information is identified. The object may be identified using, for example, face recognition or other techniques for identifying objects. The object within the color information may be identified using color information, depth information, or a combination of the two. Identifying objects may help to improve the results of enhancing the color information based on the depth information. The object recognition may identify objects which, though close to the cameras, are unimportant and need not be enhanced. For example, upon a conference table being identified, the image processor may chose to not enhance the conference table, even though its proximity to the cameras would normally result in it being enhanced.

At step 355 the weight matrix is applied to the color information. This may comprise multiplying the value of each color pixel of the color frame by the corresponding weight value in the weight matrix generated from the depth pixels. In some embodiments, more advanced techniques or algorithms may be used to more accurately combine the color pixels and the weight matrix to enhance the color image.

At step 360 the color information is enhanced based on depth information and the identified object. The enhancement may improve one or more exposure characteristics of the color information. The depicted embodiment takes into account the identification of particular objects, such as the participant's face, in enhancing the exposure characteristics of the color information. This may be done either before or after the weight matrix is applied at step 355. For example, in particular embodiments, the value of the various weights of the weight matrix may be adjusted based on the identification of particular objects. As another example, in particular embodiments, the value of the various pixels of the enhanced image may be adjusted based on the identification of particular objects.

Regardless of when the object identification is used, the end result may be to selectively enhance the exposure characteristics of particular portions of the video information. For example, objects that are identified as being objects to enhance (e.g., the participant's face) may be further enhanced in addition to the proximity based enhancement, where as objects that are identified as objects not to be enhanced (e.g., the conference table) may not be enhanced regardless of how close they are to the cameras. In particular embodiments, the enhancement may change at least one exposure characteristic of one or more objects captured within the video information. Improving the exposure of particular objects may improve the detail of those objects presented in the color image.

Some of the steps illustrated in FIG. 3 may be combined, modified or deleted where appropriate, and additional steps may also be added to the flowchart. For example, in some embodiments, synchronization between the depth pixels and the color pixels may be the first step, or it may be done only once (e.g., during production). Additionally, steps may be performed in any suitable order without departing from the scope of particular embodiments.

Technical advantages of particular embodiments may include allowing for improved image quality in a video conference in which at least one of the participants is in a poorly lighted environment. Accordingly, a remote participant may be able to better perceive details of a local participant even when, for example, there is a bright light source behind the local participant.

Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, although an embodiment has been described with reference to two separate cameras, particular embodiments may use two separate sensors but share a common lens, body, and other components. In addition, any of the elements depicted herein may be provided as integrated internal or separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. A method comprising:
   receiving captured depth information associated with a first field of view of a depth camera, the depth information represented by a first plurality of depth pixels;
   receiving captured color information associated with a second field of view of a video camera that substantially overlaps with the first field of view of the depth camera, the first field of view not identical to the second field of view, the color information represented by a second plurality of color pixels; and
   enhancing color information represented by at least one color pixel of the second plurality of color pixels to generate an enhanced image, wherein enhancing the color information comprises adjusting an exposure characteristic of the color information captured by the video camera, the at least one color pixel enhanced based on depth information represented by at least one corresponding depth pixel of the first plurality of depth pixels;
   synchronizing the depth pixels from the depth camera with the color pixels from the color camera so that the at least one depth pixel corresponds with the at least one color pixel such that the at least one depth pixel and the at least one color pixel both represent a similar portion of at least one object within both the first and second fields of view that are not identical; and
   wherein enhancing color information comprises determining that at least a first one of the at least one color pixel corresponds to a face of a person, and in response, enhancing the at least a first one of the at least one color pixel and further comprising determining that at least a second one of the at least one color pixel corresponds to an object that does not correspond to a face of a person, and in response, not enhancing the at least second one of the at least one color pixel.

2. The method of claim 1, wherein:
the depth information comprises a series of depth frames having a first frame rate;
the video information comprises a series of video frames having a second frame rate different from the first frame rate; and
synchronizing the depth pixels from the depth camera with the color pixels from the color camera further comprises synchronizing a timing relationship between the depth frames and the video frames.

3. The method of claim 1, wherein enhancing the color information from the video camera to generate an enhanced image based on the depth information from the depth camera comprises adjusting the intensity of at least a portion of the first plurality of color pixels.

4. The method of claim 1, wherein enhancing the color information from the video camera to generate an enhanced image based on the depth information from the depth camera comprises adjusting the contrast of at least a portion of the first plurality of color pixels.

5. The method of claim 1, wherein enhancing the color information from the video camera to generate an enhanced image based on the depth information from the depth camera comprises:
generating a weight matrix based on a value associated with each of the depth pixels; and
applying the weight matrix to the color pixels.

6. A system comprising:
a depth camera configured to capture depth information associated with a first field of view of the depth camera, the depth information represented by a first plurality of depth pixels;
a color camera configured to capture color information associated with a second field of view of a video camera that substantially overlaps with the first field of view of the depth camera, the color information represented by a second plurality of color pixels, the first field of view not identical to the second field of view;
an image processor coupled to the depth camera and the color camera and configured to enhance color information represented by at least one color pixel of the second plurality of color pixels to generate an enhanced image, wherein enhancing the color information comprises adjusting an exposure characteristic of the color information captured by the video camera, the at least one color pixel enhanced based on depth information represented by at least one corresponding depth pixel of the first plurality of depth pixels wherein the image processor is further configured to synchronize the depth pixels from the depth camera with the color pixels from the color camera so that the at least one depth pixel corresponds with the at least one color pixel such that the at least one depth pixel and the at least one color pixel both represent a similar portion of at least one object within both the first and second fields of view that are not identical; and
wherein enhancing color information comprises determining that at least a first one of the at least one color pixel corresponds to a face of a person, and in response, enhancing the at least a first one of the at least one color pixel and further comprising determining that at least a second one of the at least one color pixel corresponds to an object that does not correspond to a face of a person, and in response, not enhancing the at least second one of the at least one color pixel.

7. The system of claim 6, wherein:
the depth camera is further configured to capture the depth information in a series of depth frames having a first frame rate;
the video camera is further configured to capture the video information in a series of video frames having a second frame rate different from the first frame rate; and
the image processor is further configured to synchronize a timing relationship between the depth frames and the video frames.

8. The system of claim 6, wherein the image processor configured to enhance the color information from the video camera to generate an enhanced image based on the depth information from the depth camera is further configured to adjust the intensity of at least a portion of the first plurality of color pixels.

9. The system of claim 6, wherein the image processor configured to enhance the color information from the video camera to generate an enhanced image based on the depth information from the depth camera is further configured to adjust the contrast of at least a portion of the first plurality of color pixels.

10. The system of claim 6, wherein the image processor configured to enhance the color information from the video camera to generate an enhanced image based on the depth information from the depth camera is further configured to:
generate a weight matrix based on a value associated with each of the depth pixels; and
apply the weight matrix to the color pixels.

11. The system of claim 6, wherein the image processor is further configured to:
identify at least one object within the second field of view of the video camera; and
to enhance the color information from the video camera to generate an enhanced image based on the depth information from the depth camera and further based on the identification of the at least one object.

12. An apparatus comprising:
an interface configured to receive:
depth information associated with a first field of view of a depth camera, the depth information represented by a first plurality of depth pixels; and
color information associated with a second field of view of a video camera that substantially overlaps with the first field of view of the depth camera, the color information represented by a second plurality of color pixels, the first field of view not identical to the second field of view;
a processor coupled to the interface and configured to enhance color information represented by at least one color pixel of the second plurality of color pixels to generate an enhanced image, wherein enhancing the color information comprises adjusting an exposure characteristic of the color information captured by the video camera, the at least one color pixel enhanced based on depth information represented by at least one corresponding depth pixel of the first plurality of depth pixels wherein the image processor is further configured to synchronize the depth pixels from the depth camera with the color pixels from the color camera so that the at least one depth pixel corresponds with the at least one color pixel such that the at least one depth pixel and the at least one color pixel both represent a similar portion of at least one object within both the first and second fields of view that are not identical; and wherein enhancing color information comprises determining that at least a first one of the at least one color pixel corresponds to a face of a person, and in response, enhancing the at least a first one of the at least one color pixel and further comprising determining that at least a second one of the at least one color pixel corresponds to an object that does not correspond to a face of a person, and in response, not enhancing the at least second one of the at least one color pixel.

13. The apparatus of claim 12, wherein:

the interface is further configured to:
receive the depth information as a series of depth frames having a first frame rate; and
receive the video information as a series of video frames having a second frame rate different from the first frame rate; and the processor is further configured to temporally synchronize the depth pixels from the depth camera with the color pixels from the color camera so that the at least one depth pixel corresponds with the at least one color pixel such that the at least one depth pixel and the at least one color pixel both represent a similar portion of at least one object within both the first and second fields of view.

14. The apparatus of claim 12, wherein the processor configured to enhance the color information from the video camera to generate an enhanced image based on the depth information from the depth camera comprises a processor configured to adjust the intensity of at least a portion of the first plurality of color pixels.

15. The apparatus of claim 12, wherein the processor configured to enhance the color information from the video camera to generate an enhanced image based on the depth information from the depth camera comprises a processor configured to adjust the contrast of at least a portion of the first plurality of color pixels.

16. The apparatus of claim 12, wherein the processor configured to enhance the color information from the video camera to generate an enhanced image based on the depth information from the depth camera comprises a processor configured to:

generate a weight matrix based on a value associated with each of the depth pixels; and
apply the weight matrix to the color pixels.

17. The apparatus of claim 12, wherein the processor is further configured to:

identify at least one object within the second field of view of the video camera; and
enhance the color information from the video camera to generate an enhanced image based on the depth information from the depth camera and based on the identification of the at least one object.

* * * * *